United States Patent [19]

Bakker

[11] 4,440,980

[45] Apr. 3, 1984

[54] OVERVOLTAGE PROTECTION FOR A LINE CIRCUIT

[75] Inventor: Pieter Bakker, Hilversum, Netherlands

[73] Assignee: U.S. Philips Corporation, New York, N.Y.

[21] Appl. No.: 251,460

[22] Filed: Apr. 6, 1981

[30] Foreign Application Priority Data

Jan. 20, 1981 [NL] Netherlands ................ 8100242

[51] Int. Cl.³ .................. H04M 19/00; H02H 3/22
[52] U.S. Cl. ...................... 179/81 R; 179/170 NC;
330/298; 361/119; 361/91
[58] Field of Search ............. 179/78 A, 81 R, 184,
179/1 A, 170 NC; 330/298, 207 P; 340/662;
361/56, 91, 119

[56] References Cited

U.S. PATENT DOCUMENTS

| 3,564,338 | 2/1971 | Teshirogi et al. | 361/91 X |
|---|---|---|---|
| 4,254,442 | 3/1981 | Dijkmans et al. | 361/119 X |
| 4,275,277 | 6/1981 | Ferrieu | 179/170 NC |
| 4,282,555 | 8/1981 | Svedberg | 361/119 X |
| 4,306,122 | 12/1981 | Nijman et al. | 179/170 NC |
| 4,315,304 | 2/1982 | Marez et al. | 361/91 X |
| 4,331,994 | 5/1982 | Wirth | 361/56 |
| 4,338,573 | 7/1982 | van den Bungelaar et al. | 330/298 |
| 4,356,354 | 10/1982 | Ferrieu | 179/16 F X |

FOREIGN PATENT DOCUMENTS 614521 7/1978 U.S.S.R. .............................. 330/298

OTHER PUBLICATIONS

*Mullard Outlook* 4/71, Jul.; Technical Section, pp. 5-8; "50 W Audio Amplifier".
*Electronics Design* 23; Nov. 8, 1977; pp. 102-104; "Buffer Circuit For Line Driver Protects Against Shorts and ±325-V Surges," by Roxton Baker.

*Primary Examiner*—G. Z. Rubinson
*Assistant Examiner*—Keith E. George
*Attorney, Agent, or Firm*—Thomas A. Briody; William J. Streeter

[57] ABSTRACT

An overvoltage protection arrangement for preventing the occurrence of breakdown of a subscriber line control stage, independent of its structure and the integration technology used, by providing short-circuiting diodes in the control stage to prevent the occurrence of the overvoltage and providing voltage-limiting elements in those positions where overvoltage charge must be drained.

7 Claims, 7 Drawing Figures

OVERVOLTAGE PROTECTION FOR A LINE CIRCUIT

The invention relates to a control stage for a telephone subscriber's circuit for applying current in two directions to one of the wires of a subscriber's line, comprising a first supply terminal for applying a supply current to the control stage and a second supply terminal for deriving a supply current from the control stage.

BACKGROUND OF THE INVENTION

Such an arrangement, is employed in telephone systems, disclosed in Netherlands Patent Application No. 7903664.

The control stage comprises two output transistors which are connected to a wire of a subscriber's line. The control stage receives supply current from a supply source one terminal of which has a positive voltage with respect to a reference potential, commonly referred to as ground, and the other terminal of which has a negative voltage with respect to ground. This result is that in proper operating conditions the voltage at the relevant wire of the subscriber's line has a value which is located between the values of the positive and the negative supply voltage. Owing to external influences, such as, for example, inductances due to lightning or in case of a short circuit with mains the subscriber's line may be subjected to an overvoltage of, for example, 2000 V. This may cause damage to the control stage and other equipment coupled thereto. A known manner of protection is the provision of a protection circuit, designated primary protection circuit here, between each individual wire of the subscriber's line and a safety ground and between the subscriber's line wires themselves. This protection is not sufficient as the current flowing through the protection circuit to the safety ground still produces, in combination with the series impedance of the protection circuit, a residual overvoltage on the control stage. This residual overvoltage may cause damage to the control stage, particularly if said stage is implemented in integrated form.

The invention has for its object simply and efficiently to prevent damage by residual overvoltage. This manner of protection is particularly suitable for control stages of subscribers' circuits which are wholly or partly implemented in integrated form. At the same time this manner of protection is independent of the contruction of the integrated circuits, both as regards structure and the integration technology used.

According to the invention, the control stage of the type mentioned in the opening paragraph is characterized in that an overvoltage protection arrangement is provided comprising a first diode connected between the first supply terminal and the control stage, the supply current being applied to the control stage via said diode, and a second diode connected between the second supply terminal and the control stage, the supply current being discharged via said diode in such manner that normally both diodes conduct the supply current. Positioning the diodes thus results that in the event of a disturbance due to overvoltage no current can flow in the opposite direction through the base-collector junction of one of the complementary output transistors of the amplifier which is part of the control stage, in the event that the bases are interconnected. Blocking this current path results in the other output transistor not being capable of conducting current, as its base current is zero. Positioning the diodes thus has the advantage that the two output transistors are protected from damage owing to the flow of current in a direction opposite to the direction of conduction as well as from damage by an excessively high current in the direction of conduction. In the event that the bases are not interconnected, there is a possibility that a current path is created via one of the transistors owing to emitter-base breakdown and conduction in the opposite direction. This would result in that current can flow through the central supply source of the telephone system in a direction opposite to the direction in normal operating conditions. A further advantage, both for the case of interconnected bases and for the case wherein the bases are not interconnected, is therefore that the said diodes prevent reverse current from flowing through the central supply source of the telephone system. A resultant increase of the terminal voltage of the supply source which results in damage to the equipment connected thereto is also prevented in this way.

In the event of overvoltage, the provision of the said diodes prevents current from flowing through the output transistors with interconnected bases, which current flow may result in the formation across these transistors of a voltage which produces breakdown in the emitter-collector path whereby damage occurs. Using output transistors whose bases are not interconnected entails the risk of base-emitter breakdown in the event of overvoltage. Therefore, for both configurations, the control stage of the type defined in the opening paragraph is characterized in accordance with a further measure of the invention in that the safety device comprises a third diode which has one side coupled to that end of the first diode which is not connected to the first supply terminal and its other side connected to the output of the amplifier, and in that the safety device comprises a fourth diode which has one side coupled to that side of the second diode which is not coupled to the second supply terminal and its other side connected to the output of the amplifier, these third and fourth diodes normally being non-conducting. These two diodes limit the voltage difference across the output transistor to the diode forward voltage thus preventing reverse conduction and/or base-emitter breakdown and resultant damage from occurring. The control stage of the type defined in the opening paragraph comprises an external output resistor and in accordance with a further measure of the invention said control stage is characterized in that the safety device comprises a first voltage-limiting element which is connected between the side of the first diode which is not connected to the output of the amplifier and a point of constant potential and in that the safety device comprises a second voltage-limiting element connected between that side of the fourth diode which is not connected to the output of the amplifier and a different point of constant potential. This configuration has two advantages. On the one hand the electric charge associated with an overvoltage can be discharged by one of the voltage-limiting elements. On the other hand advantageous use can be made of the presence of the external output resistor of the amplifier. Namely, because of the fact that in the current discharge path formed by the external output resistor, the third or fourth diode and the first and second voltage-limiting element, respectively, substantially the entire residual overvoltage flows across the external output resistor, so that the output of the control stage is protected from overvoltage.

In accordance with a further measure of the invention the control stage of the type defined in the opening paragraph is characterized in that the third diode is connected to the first diode, that the fourth diode is connected to the second diode, that the safety device comprises a first voltage-limiting element which has one side connected to a point of constant potential and its other side coupled to the output of the amplifier via a fifth diode and that the safety device comprises a second voltage-limiting element which has one side connected to a different point of constant potential and its other side coupled to the output of the amplifier via a sixth diode, such that the fifth and sixth diodes are normally non-conducting. Directly connecting the third diode to the first diode and the fourth diode to the second diode is advantageous if the control stage is wholly or partly implemented in integrated form, the components being insulated from the substrate by means of what is commonly referred to as a junction insulation. The fourth diode then has an additional protective function, namely to prevent the diodes which are formed by the junctions between the substrate and the components located therein from becoming conductive. This conduction may occur at a negative over-voltage. The fourth diode must then be dimensioned such that it becomes conductive at a lower voltage than the diodes in the integrated circuit.

In the event of overvoltage the charge associated therewith can be discharged via the fifth diode and the first voltage-limiting element or via the sixth diode and the second voltage-limiting element. Also here the combination of the external output resistor, the fifth or sixth diode and the first and second voltage-limiting element, respectively provides an additional protection of the output of the control stage.

The control stage of the type defined in the opening paragraph is characterized in accordance with a further measure of the invention in that a seventh diode is provided, which is connected between the signal non-inverting input of the amplifier and the connecting point between the second voltage-limiting element and the sixth diode, the seventh and eighth diodes being arranged such that they are normally non-conducting. A feedback resistor is provided between the subscriber's line and the signal non-inverting input. Via this feedback resistor an overvoltage disturbance on the subscriber's line may cause damage to semi-conductors which are coupled to the signal non-inverting input of the amplifier. By means of the said feedback resistor the seventh and the eighth diodes limit the voltage on the signal non-inverting input to a range of values which has the positive and the negative supply voltage as its limits. Since a conducting diode has a very low resistance, substantially the entire overvoltage flows across the said feedback resistor. The advantage of the configuration used here is the useful additional use which is made of the feedback resistor which is already present.

It is possible that the control stages are damaged by an overvoltage difference between the wires of a subscriber's line to which the control stages are connected. This overvoltage difference may have such a value that the protection means of each individual control stage do not respond. In order to eliminate the disadvantages resulting therefrom an arrangement is provided which comprises, connected to each wire of subscriber's line a control stage as claimed in any of the claims 3, 4, 5 or 6 and which is characterized in that this arrangement comprises at least a third voltage-limiting element one side of which is connected to that side of the first voltage-limiting element which is not connected to a point of constant potential and the other side of which is coupled to that side of the second voltage-limiting element which is not connected to a point of constant potential. This manner of connecting the third voltage-limiting element has the advantage that said element functions as a protection from an overvoltage difference between the two wires of a subscriber's line, the first and the second voltage-limiting elements being jointly used by the two control stages.

BRIEF DESCRIPTION OF THE DRAWINGS

The invention and its advantages will now be further described with reference to the embodiments shown in the accompanying drawing, corresponding components in the different Figures thereof having been given the same reference numerals.

Figure 1:
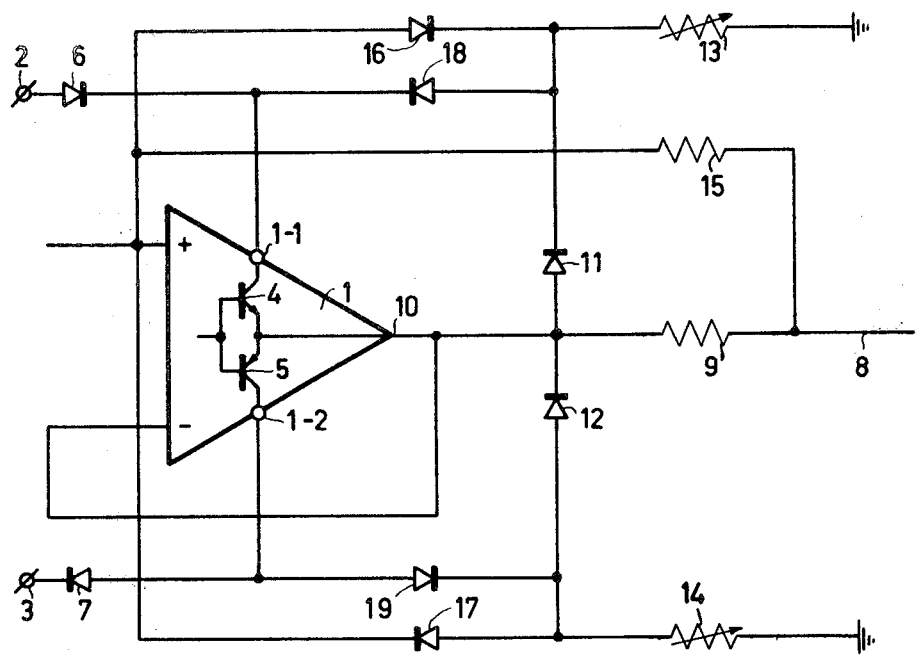
FIG. 1 shows a first embodiment of the control stage comprising the diode safety device according to the invention.
Figure 2:
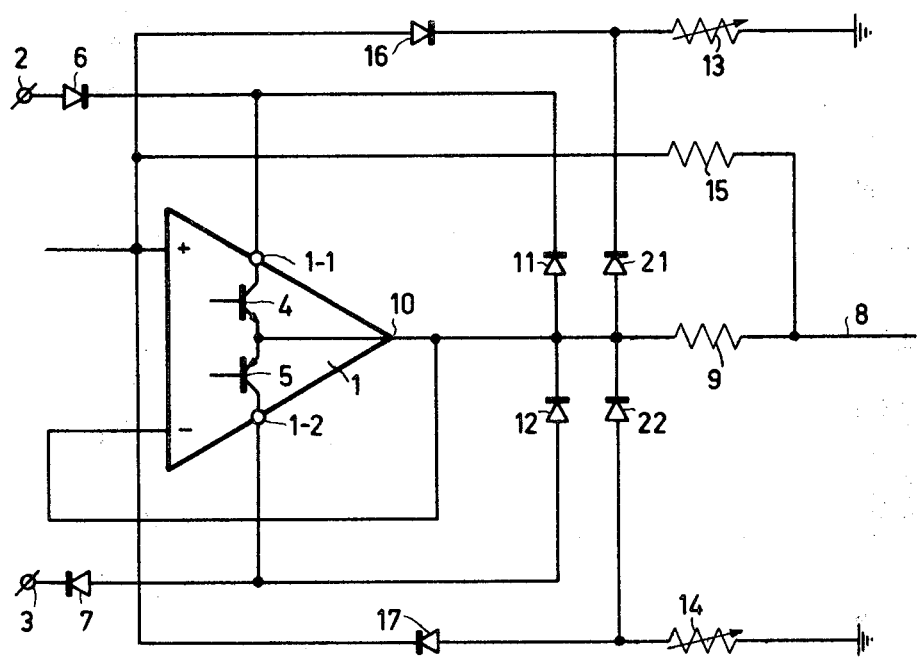
FIG. 2 shows a different embodiment of the control stage comprising the diode safety device according to the invention.

The embodiment of the control stage as shown in the FIGS. 1 and 2 comprises an amplifier 1 which has for its object to apply and derive, respectively, the current to and from a wire 8 of a subscriber's line. The output stage of this amplifier 1 comprises two complementary transistors 4 and 5, which are connected as emitter followers. The collector of transistor 4 is connected to the current supply terminal 1-1 via which supply current is applied to amplifier 1; the collector of transistor 5 is connected to current discharge terminal 1-2 via which the supply current is discharged from amplifier 1. The emitters of the transistors 4 and 5 are interconnected and connected to the output 10 of the amplifier 1.

In FIG. 1 the bases of the transistors 4 and 5 are interconnected and connected to a drive circuit, not shown. The voltage to which this drive circuit can adjust the said bases cannot become higher than the positive supply voltage and not lower than the negative supply voltage. The amplifier 1 has a signal-inverting input, which is connected to the amplifier output 10 and a signal non-inverting input, which is coupled to the subscriber's line 8 via a resistor 15, which is still to be described hereinafter. The subscriber's line 8 is coupled to the amplifier output 10 via the external output resistor 9. It should be noted that a positive and negative overvoltage, respectively, is here understood to mean a voltage on the subscriber's line which is higher than the positive supply voltage or lower than the negative supply voltage. A primary protection circuit, not shown, is provided which reduces overvoltages to the best possible extent. As this primary protection circuit has a series impedance to ground through which the overvoltage current flows, a residual overvoltage may still be present on the wire 8 of the subscriber's line. In the event of a positive residual overvoltage which reaches the amplifier output 10 from the subscriber's line 8 via the output resistor 9, the voltage at the bases of the transistors 4 and 5 will, at an increasing overvoltage, initially be made approximately equal to the positive supply voltage by the drive circuit. When the overvoltage at the amplifier output 10 continues to increase the drive circuit can no longer function as such; in addition, it substantially does not derive and apply current from and to the bases. Then the emitter of transistor 5 has a higher voltage than the associated base which itself has a higher voltage than the associated collector, so that the PNP-transistor 5 conducts current to the negative supply voltage via the emitter-collector path. A certain fraction, determined by the current gain factor of transistor 5, of this current flows from the base of transistor 5 to the base of transistor 4. The base-collector diode of transistor 4 is conductive for this direction of flow of the current and the said current fraction can thus flow to the positive supply voltage via the low resistance of this conducting diode. The emitter of transistor 4 has in the case of overvoltage a higher voltage than the base which itself has a higher voltage than the associated collector, while the base-collector diode conducts current. As a result thereof the base-emitter diode conducts in the reverse direction. The base currents of the two transistors 4 and 5 are substantially equal, so that their collector currents will be of the same order of magnitude. The possibility that a current path is formed from the base of transistor 5 to the positive side of the supply source is unwanted for several reasons. Firstly, the current flowing from the base of transistor 5 is decisive, via the current gain factor of this transistor, for the emitter and collector currents of said transistor, which also holds for transistor 4. The possibility that the base current may be discharged unimpededly may result in a very large emitter and collector currents whereby the transistors 4 and 5 may be damaged. Secondly, in the present case, transistor 4 is in a conduction state for which it has not been designed, which greatly increases the chance of damage to transistor 4. Finally, a current entering the supply source at the positive side may cause the terminal voltage of the source to increase which may damage further equipment connected to said supply source. In order to block this unwanted current path a diode 6 is connected to current supply terminal 1-1 of the amplifier in such a way that current is only conducted in the direction from diode 6 to the current supply terminal 1-1. This has the advantage that current is prevented from flowing through the base-collector diode of transistor 4; as a result thereof also the base current of transistor 5 has become substantially equal to zero, so that not more than a very limited current can flow through the emitter-collector path of transistor 5. So the provision of diode 6 protects transistors 4 and 5 from damage by positive overvoltage at the amplifier output 10 and also provides a protection of the further equipment connected to the central supply source from overvoltage via this source. A comparable protection from negative overvoltages is provided by diode 7. This diode 7 is connected to current discharge terminal 1-2 in such manner that current can only be conducted in the direction from the current discharge terminal 1-2 to the diode 7. In all other respects diode 7 functions for negative overvoltages in the same way as diode 6 functions for positive overvoltages.

In the event that the bases of the transistors 4 and 5 are not directly interconnected (as is the case in FIG. 2), the current path is not obtained by means of the above-described procedure. However, in this case breakdown in the base-emitter diode of transistor 4 will occur at a sufficiently high positive overvoltage, whereby current might flow to the positive side of the supply source. This is prevented by diode 6; also in this case diode 7 has a comparable function.

In the event of a positive overvoltage at the amplifier output 10 the base-emitter diode of transistor 4 is in the cut-off state. Breakdown in this diode destroys transistor 4. In order to limit the voltage across transistor 4, which voltage causes the breakdown, a diode 11 is provided between the emitter of transistor 4 and the current supply terminal 1-1, as shown in FIG. 2. One side of diode 11 is connected to the amplifier output 10, the other side to current supply terminal 1-1. The forward direction of diode 11 is from amplifier output 10 to the current supply wire 1-1. Because diode 11 has been provided in the above-described manner, the voltage between the emitter and the collector of transistor 4 cannot exceed, in the event of positive overvoltage, the forward voltage of diode 11. In said case the base voltage and the collector voltage of transistor 4 are substantially equal to each other, so that the voltage difference between the base and the emitter of transistor 4 does not become larger than the forward voltage of diode 11, so that base-emitter breakdown in transistor 4 is prevented from occurring. Diode 12 is provided as a protection from breakdowns, specifically in transistor 5, caused by negative overvoltage at the amplifier output 10. One side of diode 12 is connected to the amplifier output 10, the other side is connected to current discharge terminal 1-2. As regards negative overvoltage at output 10, diode 12 provides breakdown protection in the same way as provided by diode 11 for positive overvoltages. This manner of breakdown protection has the advantage that it is very simple, said simple protection furthermore promoting the reliability of operation.

It should be noted that it is possible to provide a diode 18, still to be described hereinafter, between diode 11 and current supply terminal 1-1 in series with diode 11, as shown in FIG. 1. This diode 18, which is connected in the same sense as diode 11 does not have any limiting effect on the protective operation of diode 11. The maximum voltage difference between the base and the emitter of transistor 4 is equal to the sum of the forward voltages of the diodes 11 and 18, which is not objectionable. Likewise, it is possible to provide a diode 19 between diode 12 and current discharge terminal 1-2 in series with diode 12. What is described above for diode 18 relative to diode 11 and transistor 4 also holds for this diode 19 relative to diode 12 and transistor 5.

In order to enable charge drainage, the protection device of the control stage comprises two voltage-limiting elements 13 and 14. These voltage-limiting elements may, for example, be in the form of voltage-dependent resistors, designated VDR's, or zener diodes. Without detracting from the usability of zener diodes it will be assumed in the further course of this description for the sake of simplicity that VDR's are used as the voltage-limiting elements.

In FIG. 1 the VDR 13 is connected between first point of constant potential and that side of diode 11 which is not connected to the amplifier output 10; the VDR 14 is connected between a second point of constant potential and that side of diode 12 which is not connected to the amplifier output 10. The voltages at which a VDR responds is defined as that voltage across the VDR at which the differential resistance of the VDR has a value which is a predetermined number of times smaller than the value of the output resistor 9. The VDR 13 is selected such that the voltage at which it responds is approximately equal to the nominal positive supply voltage, the VDR 14 being chosen such that the voltage at which it responds is approximately equal to the absolute value of the rated negative supply voltage. The usefulness of the voltage-dependent resistors 13 and 14 is in the fact that in the event of an overvoltage disturbance on the subscriber's line they immediately discharge the electric charge accompanying the disturbance, thus reducing the overvoltage. An additional advantage of the provision of the voltage-dependent resistors 13 and 14 is, that they offer an extra protection in addition to the primary protection of the line circuit. In the event that, at a residual positive overvoltage on the subscriber's line 8 the voltage at the amplifier output 10 exceeds the voltage at which VDR 13 responds, the differential resistance of diode 11 and VDR 13 is much lower than the value of resistor 9. By far the major part of the overvoltage then flows across resistor 9, as a result of which the amplifier output is protected from overvoltage. Diode 12 and VDR 14 have the same function with respect to negative overvoltae as diode 11 and VDR 13 have with respect to positive overvoltage.

FIG. 2 shows an alternative possibility for the arrangement of the two voltage-limiting elements. The VDR 13 is connected by means of one side to a first point of constant potential and by means of its other side it is coupled to the amplifier output 10 via a diode 21; one side of the VDR 14 is connected to a second point of constant potential and the other side is coupled to the amplifier output 10 via a diode 22. In this configuration charge drainage and additional overvoltage protection is effected in the same way as described for the corresponding voltage-dependent resistors of FIG. 1.

The signal non-inverting input of the amplifier 1 is connected to the subscriber's line 8 via a feedback resistor 15. Via the feedback resistor 15 overvoltage on subscriber's line 8 may produce an overvoltage on the signal non-inverting input of the amplifier 1. This overvoltage may cause damage to elements of amplifier 1 which are coupled to the signal non-inverting input, in particular to the input transistors of the amplifier 1. Protection from overvoltage on the signal non-inverting input of amplifier 1 is provided by the diodes 16 and 17. One side of diode 16 is connected to VDR 13, the other side is connected to the signal non-inverting amplifier input; the forward direction of diode 16 extends from the signal non-inverting amplifier input to VDR 13. One side of diode 17 is connected to VDR 14, the other side of the signal non-inverting amplifier input. In the presence of an overvoltage on the signal non-inverting amplifier input, the combination of diode 16 and VDR 13 or the combination of diode 17 and VDR 14 will become conductive, depending on the polarity of the overvoltage. The differential resistance of the voltage-dependent resistors 13 and 14 is low relative to the resistor 9, if the voltage across these voltage-dependent resistors increases to above the voltage at which they respond. The feedback resistor 15 has a much higher value than the output resistor 9, so that the differential resistance of the voltage-dependent resistors is low relative to the value of resistor 15. Also the diodes 16 and 17 have a low resistance in the conductive state. This means that an overvoltage on subscriber's line 8 flows substantially wholly across resistor 15. Arranging the diodes 16 and 17 as described in the foregoing has the advantage that, since feedback resistor 15 is used as a safety resistor, no separate safety resistor need be provided.

In FIG. 1 the positive supply voltage is coupled to VDR 13 via the diodes 6 and 18, the negative supply voltage being coupled to VDR 14 via the diodes 7 and 19. The forward direction of diode 18 extends from VDR 13 to diode 6; the forward direction of diode 19 from diodes 7 to VDR 14. Diode 18 has for its function to inhibit the current path from the positive voltage via diode 6 and VDR 13 to the system ground. This current path may possibly be formed if a fluctuation in the supply voltage would increase said voltage to above the voltage at which VDR 13 responds. Diode 19 has a similar function with respect to the negative supply voltage and VDR 14. The usefulness of the diodes 18 and 19 is the fact that they protect the voltage-dependent resistors 13 and 14 and oppose unwanted leakage current from the supply source to the system ground.

Figure 3:
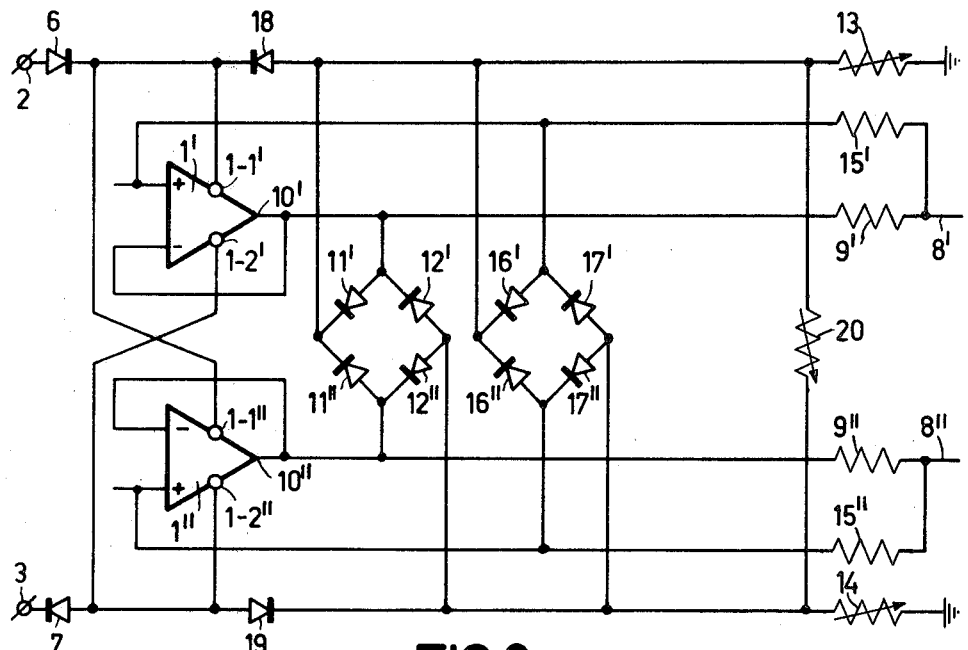
FIG. 3 shows a line circuit comprising two control stages in accordance with the invention, the control stages being protected from an overvoltage difference on the wires of the subscriber's line.
Figure 4:
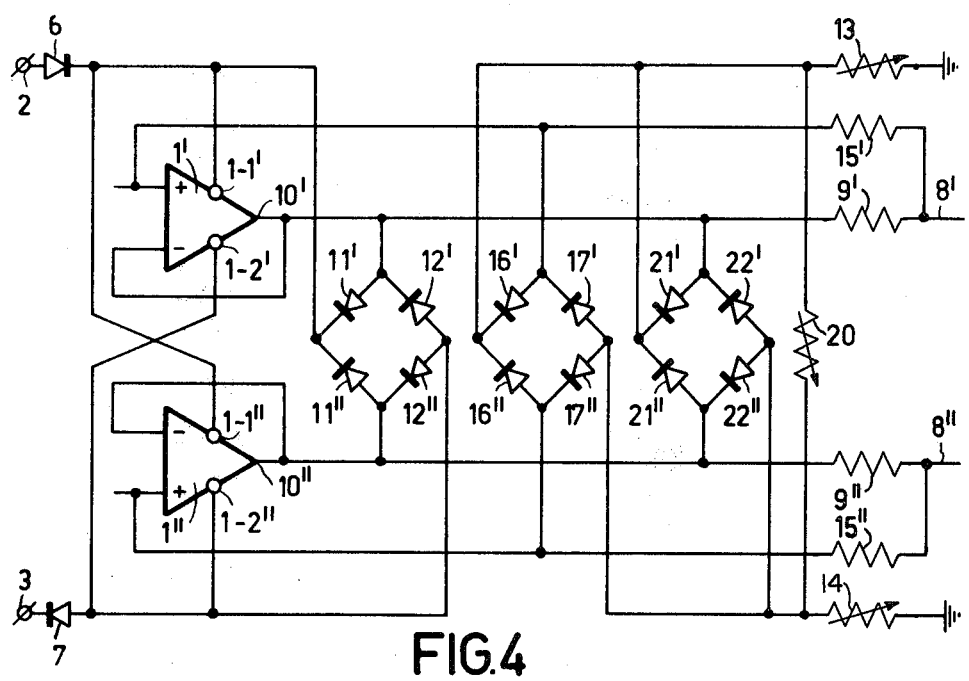
FIG. 4 shows a different line circuit comprising two control stages in accordance with the invention, the control stages also being protected from an overvoltage difference on the wires of the subscriber's line.

FIGS. 3 and 4 show a line circuit in which each of the two wires of a subscriber's line comprises a control stage, the line circuit of FIG. 3 comprising control stages as shown in FIG. 1; the line circuit of FIG. 4 comprises control stages as shown in FIG. 2. A portion of the protection elements which have already been described with reference to FIGS. 1 and 2 is used in common by the two control stages; of the other portion one path is associated with one control stage, the other part with the other control stage. The elements which are shared by the two control stages have been given a reference numeral without an accent; the elements used by the control stage 1' have been given a reference numeral provided with an accent; the corresponding elements used by the control stage 1" have been given the same reference numerals provided with two accents. FIGS. 3 and 4 comprise a VDR 20 which is connected between those sides of the voltage-dependent resistors 13 and 14 which are not connected to the system ground. VDR 20 has for its function to protect the control stages from an overvoltage difference between the subscriber's line wires 8' and 8". There is a possibility that the wires 8' and 8" carry each a voltage at which the voltage-dependent resistors 13 and/or 14 do not respond, but that the difference between these voltages may cause damage to the control stages 1' and 1". Therefore, the voltae at which VDR 20 responds is smaller than the sum of the voltages at which the voltage-dependent resistors 13 and 14 respond. It is alternatively possible to use instead of the VDR 20 two oppositely directed, series-arranged zener diodes, which makes it possible to offer protection from an overvoltage difference between the wires 8' and 8" which has a value which differs from the value of an overvoltage difference between the wires 8" and 8'.

What is claimed is:
1. A control stage for a telephone subscriber's line for applying current in two directions to one wire of said subscribers's line comprising:
    an amplifier having an input and an output;
    said amplifier further having a first supply terminal (1-1) and a second supply terminal (1-2) for applying a supply current to said amplifier;
    a first diode (6) connected between said first supply terminal (1-1) and a first voltage source (2) and a second diode (7) connected between said second supply terminal (1-2) and a second voltage source (3), the supply current being applied to and discharged from said amplifier via said diodes;

a third diode (11) connected between the output of said amplifier and said first supply terminal; and a fourth diode (12) connected between the output of said amplifier and said second supply terminal.

2. The invention according to claim 1 further comprising:

an external resistor connected in series with the output of said amplifier and said one wire of the subscriber's line;

a first voltage-limiting element (13) connected between that side of said third diode (11) which is not connected to the output of said amplifier and a point of constant potential; and a second voltage-limiting element (14) connected between that side of said fourth diode (12) which is not connected to the output of said amplifier and a point of constant potential.

3. The invention according to claim 1 further comprising:

an external resistor connected in series with the output of said amplifier and said one wire of the subscriber's line;

a first voltage-limiting element (13) and a fifth diode (21), one side of said first voltage-limiting element being connected to a point of constant potential and the other side being coupled to the output of said amplifier through said fifth diode;

a second voltage-limiting element (14) and a sixth diode (22), one side of said second voltage-limiting element being connected to a point of constant potential and the other side being coupled to the output of said amplifier through said sixth diode.

4. The invention according to claim 2 wherein the input of said amplifier comprises a signal inverting input and a signal non-inverting input further comprising:

a feedback circuit from that end of the external resistor that is not connected to the output of said amplifier to the signal non-inverting input of said amplifier;

a seventh diode (16) connected between the signal non-inverting input of said amplifier and that side of said first voltage-limiting element (13) which is not connected to a point of constant potential; and an eighth diode (17) connected between the signal non-inverting input of said amplifier and that side of said second voltage-limiting element (14) which is not connected to a poit of constant potential, said seventh and eighth diodes being arranged such that they are normally non-conducting.

5. The invention according to claim 3 wherein the input of said amplifier comprises a signal inverting input and a signal non-inverting input further comprising:

a feedback circuit from that end of the external resistor that is not connected to the output of said amplifier to the signal non-inverting input of said amplifier;

a seventh diode (16) connected between the signal non-inverting input of said amplifier and that side of said first voltage-limiting element (13) which is not connected to a point of constant potential; and an eighth diode (17) connected between the signal non-inverting input of said amplifier and that side of said second voltage-limiting element (14) which is not connected to a point of constant potential, said seventh and eighth diodes being arranged such that they are normally non-conducting.

6. The invention according to claim 2 further comprising a third voltage-limiting element (20) one side of which is connected to that side of said first voltage-limiting element (13) which is not connected to a point of constant potential and the other side of which is coupled to that side of said second voltage-limiting element (14) which is not connected to a point of constant potential.

7. The invention according to claim 3 further comprising a third voltage-limiting element (20) one side of which is connected to that side of said first voltage-limiting element (13) which is not connected to a point of constant potential and the other side of which is coupled to that side of said second voltage-limiting element (14) which is not connected to a point of constant potential.

* * * * *